US011827499B2

(12) United States Patent
Yang

(10) Patent No.: US 11,827,499 B2
(45) Date of Patent: Nov. 28, 2023

(54) DOUBLE PARALLELOGRAM VERTICAL LIFTING DEVICE

(71) Applicant: QUEN LIN INSTRUMENTS CO., LTD., New Taipei (TW)

(72) Inventor: Chien-Chen Yang, New Taipei (TW)

(73) Assignee: QUEN LIN INSTRUMENTS CO., LTD., New Taipei (TW)

( * ) Notice: Subject to any disclaimer, the term of this patent is extended or adjusted under 35 U.S.C. 154(b) by 345 days.

(21) Appl. No.: 17/224,681

(22) Filed: Apr. 7, 2021

(65) Prior Publication Data

US 2022/0324685 A1 Oct. 13, 2022

(51) Int. Cl.
*B66F 3/00* (2006.01)
*F15B 15/14* (2006.01)
*B66F 3/12* (2006.01)
*B66F 3/24* (2006.01)
*A61G 5/14* (2006.01)
(Continued)

(52) U.S. Cl.
CPC .................. *B66F 3/00* (2013.01); *A61G 5/04* (2013.01); *A61G 5/14* (2013.01); *B66F 3/12* (2013.01); *B66F 3/245* (2013.01); *F15B 15/14* (2013.01); *A47C 3/24* (2013.01); *A61G 5/107* (2013.01); *A61G 5/1081* (2016.11); *A61G 15/02* (2013.01); *E04H 6/188* (2013.01); *F16H 25/20* (2013.01); *F16H 2025/2084* (2013.01)

(58) Field of Classification Search
CPC ...... A61G 5/14; A61G 5/1059; A61G 5/1075; A61G 3/062; A61G 5/04; A61G 5/107; A61G 5/1081
See application file for complete search history.

(56) References Cited

U.S. PATENT DOCUMENTS 4,083,599 A * 4/1978 Gaffney .................... A61G 5/14
297/DIG. 10
4,124,098 A * 11/1978 Dudynskyj ........... B60P 1/4421
280/166

(Continued)

FOREIGN PATENT DOCUMENTS

KR 20220031813 * 3/2022
KR 20220031813 A * 3/2022

(Continued)

*Primary Examiner* — Mahdi H Nejad
(74) *Attorney, Agent, or Firm* — MUNCY, GEISSLER, OLDS & LOWE, P.C.

(57) ABSTRACT

The present invention provides a double parallelogram vertical lifting device comprising a linkage mechanism and a pushing device. The linkage mechanism comprises a first shaft seat, a second shaft seat, a third shaft seat, an upper support unit movably coupled to the first shaft seat and the second shaft seat on both ends, and a lower support unit movably coupled to the second shaft seat and the third shaft seat on both ends. The upper support unit is provided with a first gear, and the lower support unit is provided with a second gear that meshes with the first gear. The pushing device has one end set on the upper support unit and the other end set on the lower support unit. The invention utilizes the interaction of the first gear and the second gear to generate a reaction force, which enables the lower support unit to cooperate with the upper support unit to move up and down synchronously, and achieves the effect of simple structure and large load capacity.

10 Claims, 6 Drawing Sheets

(51) Int. Cl.
*A61G 5/04* (2013.01)
*A61G 15/02* (2006.01)
*F16H 25/20* (2006.01)
*A47C 3/24* (2006.01)
*E04H 6/18* (2006.01)
*A61G 5/10* (2006.01)

(56) References Cited

U.S. PATENT DOCUMENTS

2013/0000542 A1\* 1/2013 Muller .................... B63B 27/30
                                                                                                     114/362
2021/0196047 A1\* 7/2021 Zhang ..................... A61G 5/14
2022/0061536 A1\* 3/2022 Cooper ................ A47C 1/0242

FOREIGN PATENT DOCUMENTS

| TW | 1734264 B | \* | 11/2019 |
| TW | 202120419 A | \* | 6/2021 |
| WO | WO 2021116871 A1 | \* | 6/2021 |

\* cited by examiner

DOUBLE PARALLELOGRAM VERTICAL LIFTING DEVICE

BACKGROUND OF THE INVENTION

1. Technical Field

The present invention relates to a vertical lifting device, in particular to a double parallelogram vertical lifting device with simple structure, small volume, high stroke and large load capacity.

2. Description of Related Art

A general vertical lifting device has an electric control mechanism, a hydraulic cylinder controlled by the electric control mechanism, a Z-shaped connecting rod group connected to the hydraulic cylinder, and an object set on the connecting rod group. The electric control mechanism can be used to control the expansion and contraction of the hydraulic cylinder, so that the hydraulic cylinder drives the Z-shaped connecting rod group to rise and fall, so that the object is driven by the Z-shaped connecting rod group to rise or fall.

However, a general vertical lifting device (such as a Z-shaped connecting rod group or a single parallelogram lifter) not only has a complicated electronic control mechanism, but also has a larger volume than a double-stroke device due to a single-stroke design. The design of the Z-shaped connecting rod group makes the output resistance of the thrust force large, and the lever offset is also large. Its offsetting force is about ⅔ of the original thrust force (for example, a thrust force of 600 kg is offset by about 400 kg). In addition, the push-up stroke needs to rely on the linkage arm distance, but the distance of the arm distance stroke is long. Although it can push up, the longer the arm length, the greater the resistance. Therefore, heavier objects cannot be set on the Z-shaped connecting rod group, which results in obvious shortcomings in actual use. The design of the single parallelogram lifter is that the position of the fulcrum and the center of gravity deviates too much, so a greater torque must be applied to push the platform up and down, which causes the efficiency of the lifter to decrease.

BRIEF SUMMARY OF THE INVENTION

The primary objective of the present invention is to connect a required object to a first shaft seat, drive an upper support unit to move up or down by a pushing unit, and use a first gear and a second gear to cooperate to generate a reaction force to make a lower support unit rise or fall synchronously, so that the upper support unit and the lower support unit are expanded or folded, so that the object can be moved up or down by a linkage unit to achieve the effect of simple structure and large load capacity.

To achieve the above objective, the present invention provides a double parallelogram vertical lifting device, which includes a linkage mechanism and a pushing device. The linkage mechanism comprises a first shaft seat, a second shaft seat, a third shaft seat, an upper support unit movably coupled to the first shaft seat and the second shaft seat on both ends, and a lower support unit movably coupled to the second shaft seat and the third shaft seat on both ends. The upper support unit is provided with a first gear, and the lower support unit is provided with a second gear that meshes with the first gear. The pushing device has one end set on the upper support unit and the other end set on the lower support unit. The upper support unit has a first connecting arm assembly and a second connecting arm assembly arranged in parallel with each other between the first shaft seat and the second shaft seat. The two ends of the first connecting arm assembly and the second connecting arm assembly are movably coupled to the first shaft seat and the second shaft seat respectively so as to form a parallelogram on both sides of the first shaft seat and the second shaft seat respectively. The lower support unit has a third connecting arm assembly and a fourth connecting arm assembly arranged in parallel with each other between the second shaft seat and the third shaft seat. The two ends of the third connecting arm assembly and the fourth connecting arm assembly are movably coupled to the second shaft seat and the third shaft seat respectively so as to form a parallelogram on both sides of the second shaft seat and the third shaft seat respectively.

Therefore, the double parallelogram vertical lifting device of the present invention can effectively improve the deficiency of conventional device, and can connect a required object to the first shaft seat, drive the upper support unit to move up or down by the pushing unit, and use the first gear and the second gear to cooperate to generate a reaction force to make the lower support unit rise or fall synchronously, so that the upper support unit and the lower support unit are expanded or folded, so that the object can be moved up or down by the linkage mechanism to achieve the effect of simple structure, small volume, high stroke and large load capacity.

DETAILED DESCRIPTION OF THE INVENTION

Figure 1:
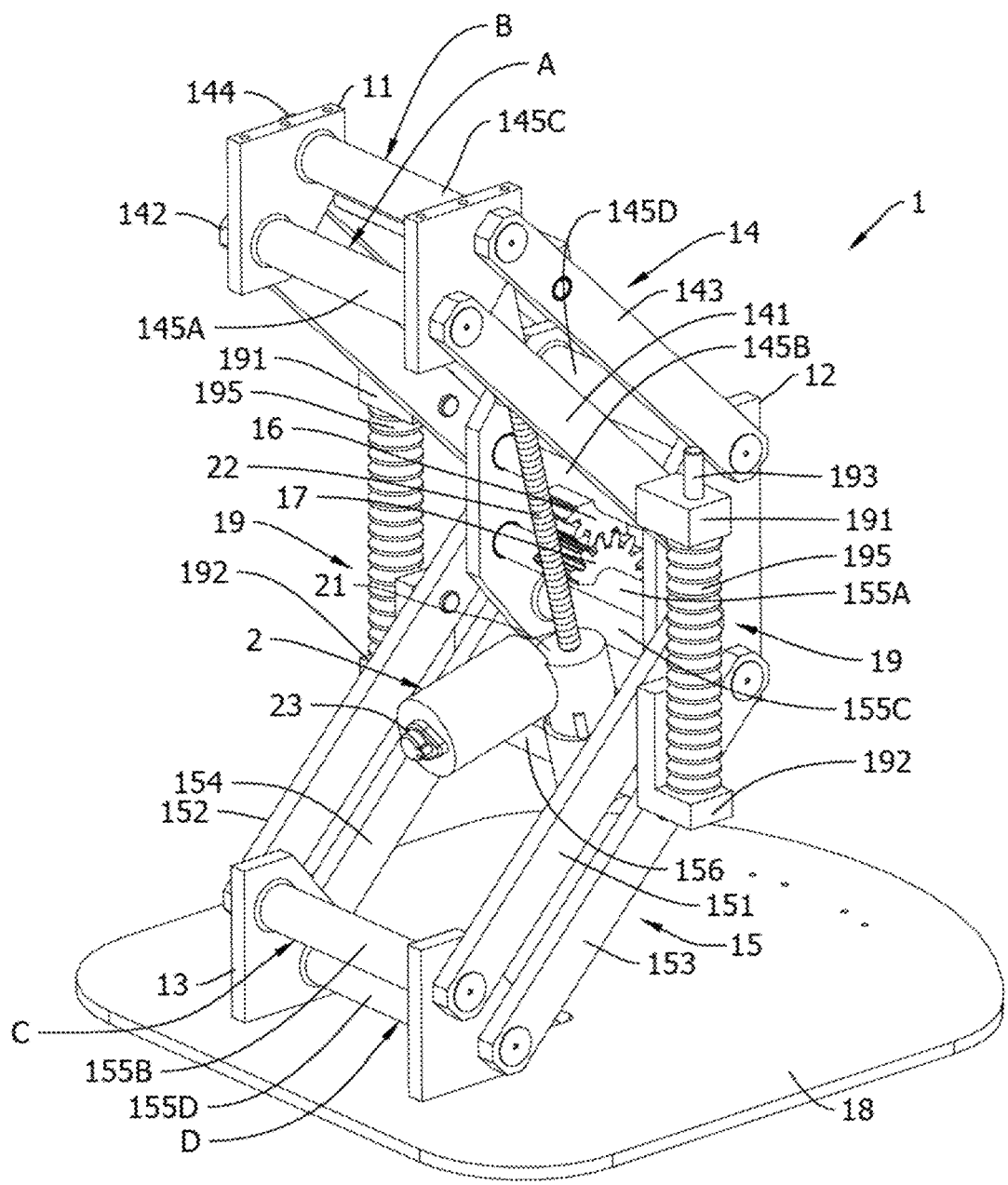
FIG. 1 is a perspective view of the present invention.
Figure 2:
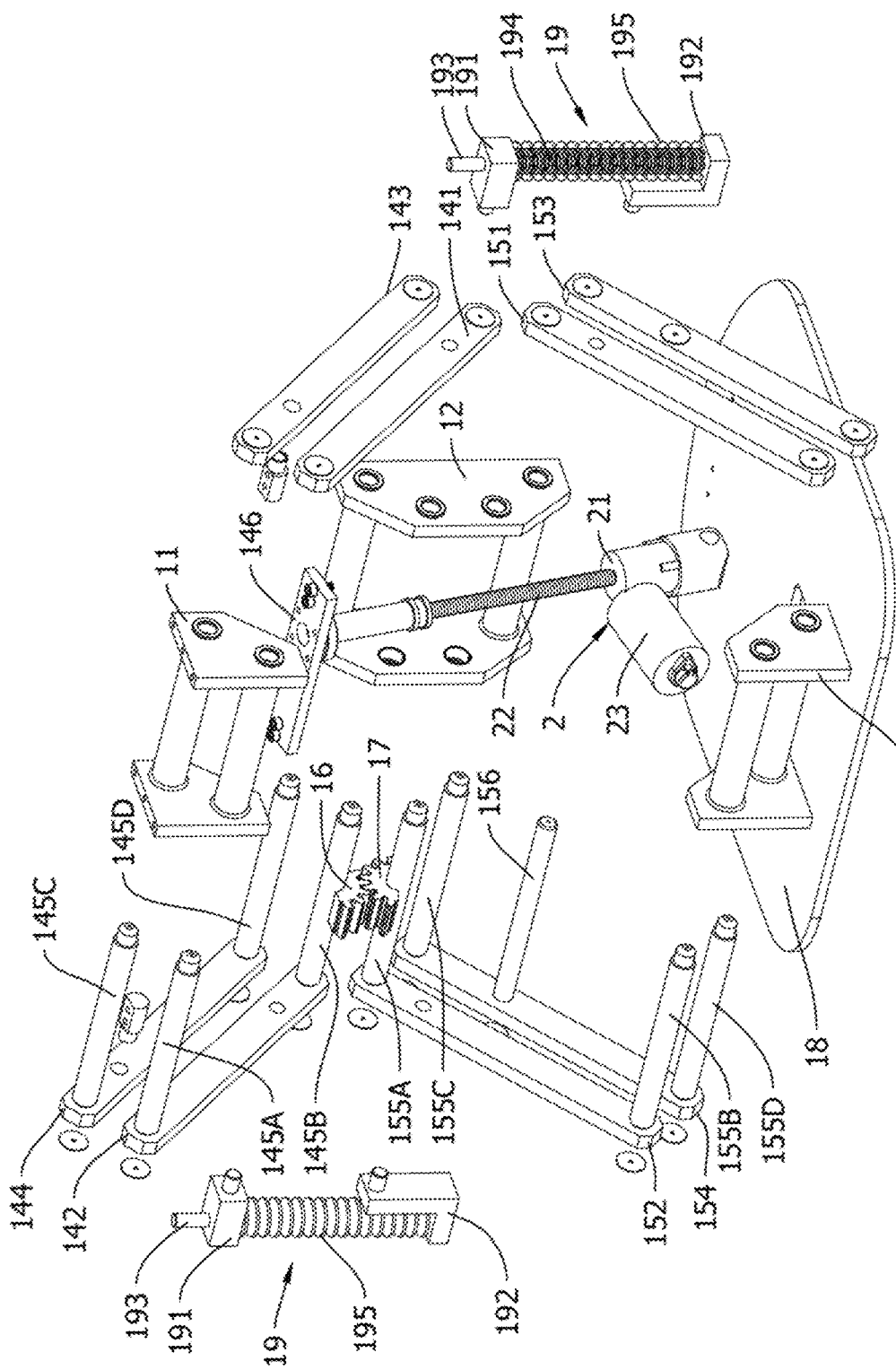
FIG. 2 is a three-dimensional exploded schematic view of the present invention.

The details and technical solution of the present invention are hereunder described with reference to accompanying drawings. For illustrative sake, the accompanying drawings are not drawn to scale. The accompanying drawings and the scale thereof are not restrictive of the present invention.

Please refer to FIG. 1 to FIG. 4 respectively for a perspective view, a three-dimensional exploded schematic view, a schematic diagram of an ascending state, and a schematic diagram of a descending state of the present invention. As shown in the figures, a double parallelogram vertical lifting device of the present invention is composed of at least a linkage mechanism 1 and a pushing device 2.

The linkage mechanism 1 includes a first shaft seat 11, a second shaft seat 12, a third shaft seat 13, an upper support unit 14, and a lower support unit 15. The upper support unit 14 is movably coupled to the first shaft seat 11 and the second shaft seat 12 on both ends, and the lower support unit 15 is movably coupled to the second shaft seat 12 and the third shaft seat 13 on both ends. The upper support unit 14 is provided with a first gear 16, and the lower support unit 15 is provided with a second gear 17 that meshes with the first gear 16.

The upper support unit 14 has a first connecting arm assembly A and a second connecting arm assembly B arranged in parallel with each other between the first shaft seat 11 and the second shaft seat 12. The two ends of the first connecting arm assembly A and the second connecting arm assembly B are movably coupled to the first shaft seat 11 and the second shaft seat 12 respectively so as to form a parallelogram on both sides of the first shaft seat 11 and the second shaft seat 12 respectively. The lower support unit 15 has a third connecting arm assembly C and a fourth connecting arm assembly D arranged in parallel with each other between the second shaft seat 12 and the third shaft seat 13. The two ends of the third connecting arm assembly C and the fourth connecting arm assembly D are movably coupled to the second shaft seat 12 and the third shaft seat 13 respectively so as to form a parallelogram on both sides of the second shaft seat 12 and the third shaft seat 13 respectively.

The above-mentioned "movably coupled" means that the upper support unit 14 (or the lower support unit 15) and the first shaft seat 11 (or the second shaft seat 12, the third shaft seat 13) are fixed at the combined position, but the upper support unit 14 (or the lower support unit 15) can rotate with respect to the first shaft seat 11 (or the second shaft seat 12, the third shaft seat 13). The "movably coupling" is, for example, but not limited to, pivotal connection or hinged connection.

The pushing device 2 has one end set on a first positioning unit 146 on the upper support unit 14 and the other end set on a second positioning unit 156 on the lower support unit 15. The first positioning unit 146 and the second positioning unit 156 can be positioning rods, positioning pieces or other similar mechanisms. These mechanisms are mainly configured according to the requirements of the pushing device 2, but the present invention has no limitation in this regard. In a feasible embodiment, the pushing device 2 includes a fixed end 21, a movable end 22, and a driving unit 23. The movable end 22 and the fixed end 21 are combined with the upper support unit 14 and the lower support unit 15 respectively. The driving unit 23 drives the movable end 22 to expand and contract with respect to the fixed end 21. In the present invention, the pushing device 2 can be, but not limited to, an electric screw assembly, a hydraulic cylinder, a hydraulic control device, or a pneumatic cylinder.

Figure 4:
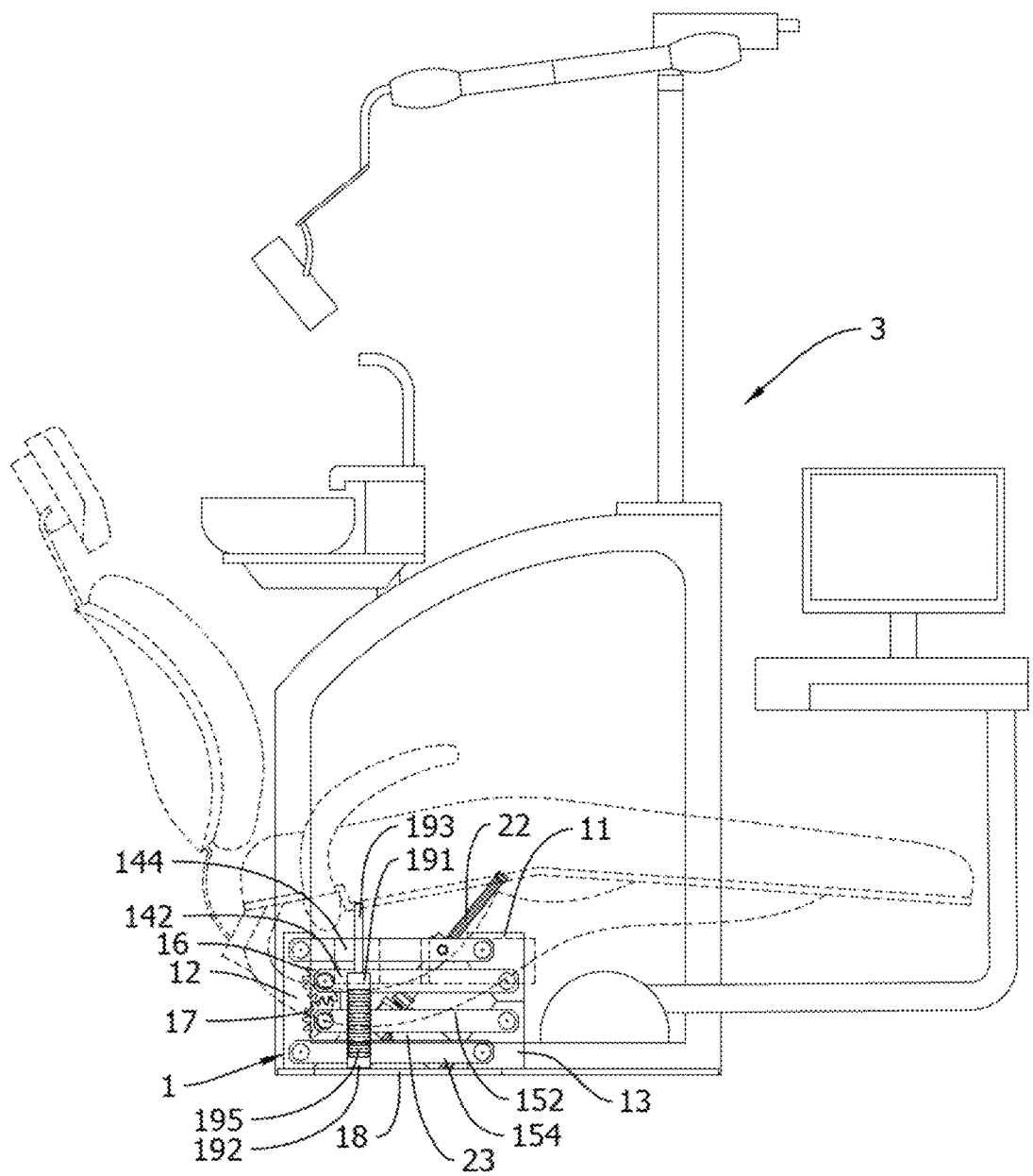
FIG. 4 is a schematic diagram of a descending state of the present invention.
Figure 5:
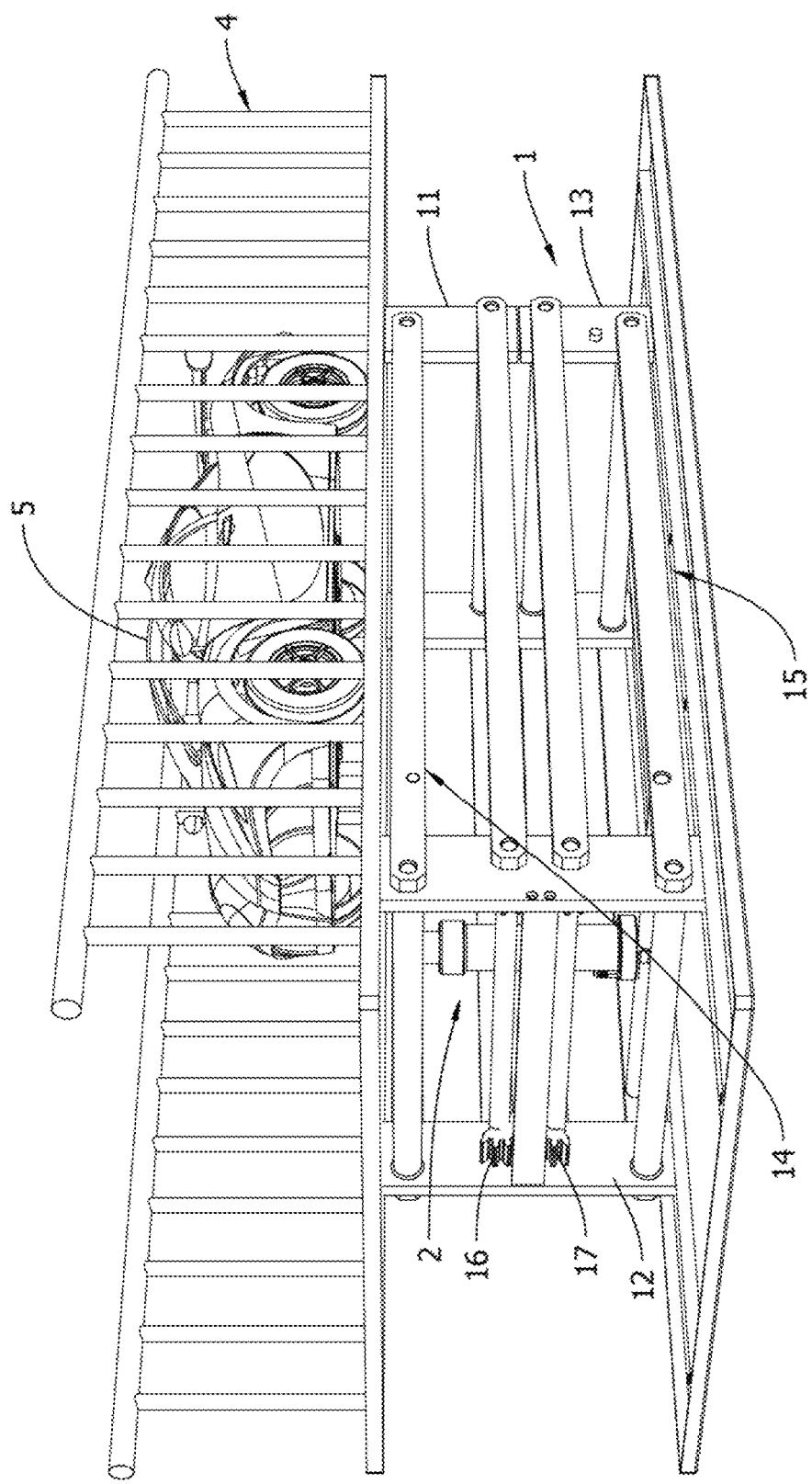
FIG. 5 is a schematic diagram of another application embodiment of the present invention.

When the present invention is in use, the linkage mechanism 1 further includes a base 18, the third shaft seat 13 is fixed on one surface of the base 18 to carry the third shaft seat 13 and the components on the third shaft seat 13, and a required object 3 is combined with the first shaft seat 11. For example, the product can be applied to related objects such as dental equipment, operating beds, equipment for obstetrics and gynecology, industrial lifting platforms, or seats (as shown in FIG. 4 and FIG. 5), and these application examples are not within the scope of the invention. In this embodiment, dental equipment is taken as a specific embodiment for description.

Figure 3:
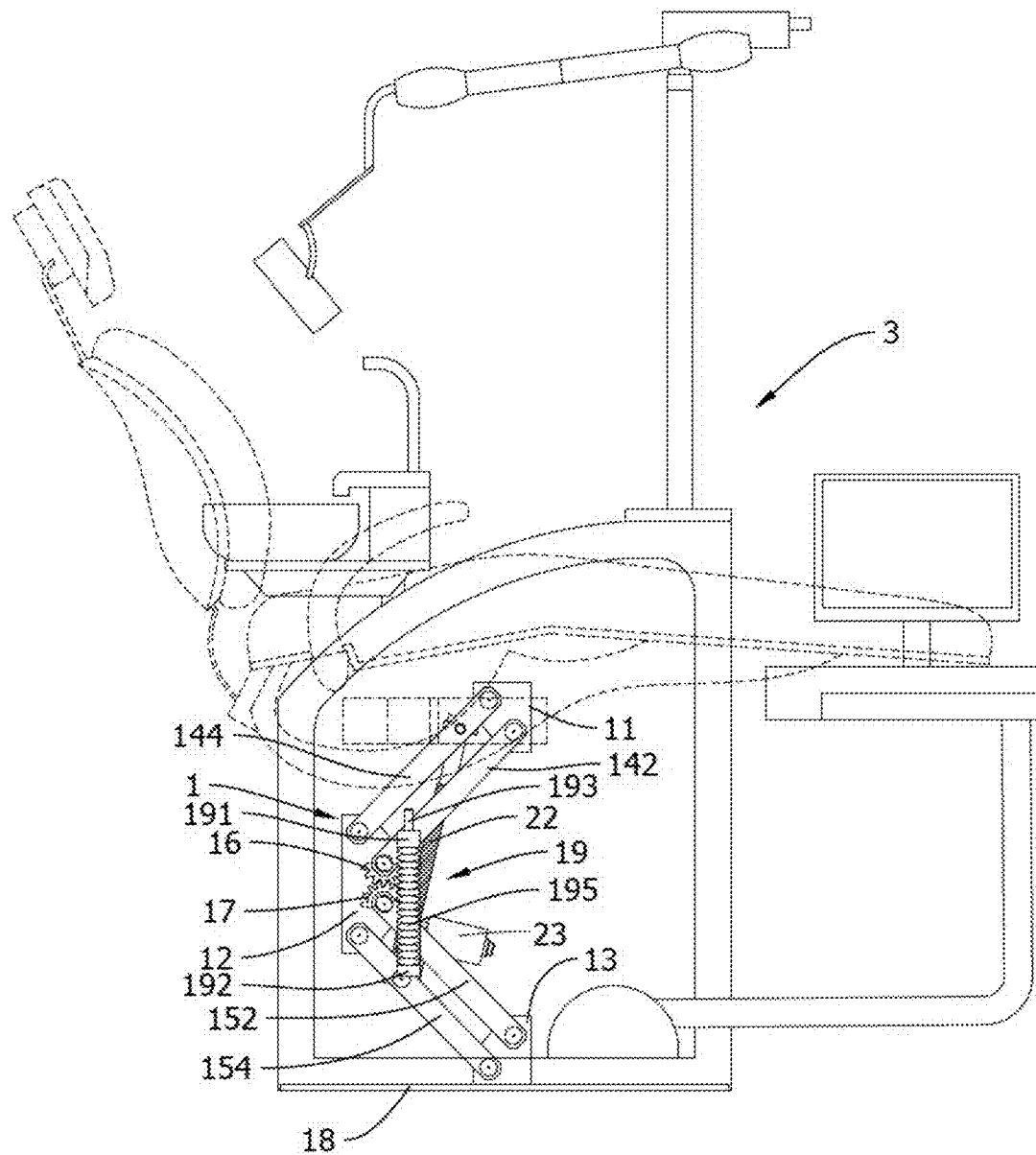
FIG. 3 is a schematic diagram of an ascending state of the present invention.

When the object 3 is to be raised, the upper support unit 14 is driven by the pushing device 2 to move upward, and the first gear 16 and the second gear 17 are used to cooperate with each other to generate the required reaction force to force a first lower shaft 155A of the lower support unit 15 to cooperate with a second upper shaft 145B of the upper support unit 14 to rotate, so that the lower support unit 15 rises synchronously, and then the upper support unit 14 and the lower support unit 15 are expanded, thereby driving the first shaft seat 11 to rise, so that the object 3 is driven by the linkage mechanism 1 to rise (as shown in FIG. 3). In this way, the effect of simple structure and large load capacity can be achieved so that the linkage mechanism 1 can easily drive the object 3 to rise.

When the object 3 is to be lowered, the upper support unit 14 is driven to move downward by the pushing device 2, and the first gear 16 and the second gear 17 are used to cooperate with each other to generate the required reaction force, so that the lower support unit 15 is lowered synchronously, and then the upper support unit 14 and the lower support unit 15 are in a state of abutting each other, so that the object 3 is driven by the linkage mechanism 1 to descend.

The present invention adopts the design of double parallelograms to generate reverse thrust between the shaft and the shaft matching gears, so that the two parallelograms rise and fall synchronously.

In an embodiment of the present invention: The first connecting arm assembly A has a first upper connecting arm 141, a second upper connecting arm 142, and a first upper shaft body 145A and a second upper shaft body 145B connecting the first upper connecting arm 141 and the second upper connecting arm 142. The second connecting arm assembly B has a third upper connecting arm 143, a fourth upper connecting arm 144, and a third upper shaft body 145C and a fourth upper shaft body 145D connecting the third upper connecting arm 143 and the fourth upper connecting arm 144. The shaft body and the connecting arm are fixedly combined (i.e., they cannot be pivoted), but the shaft body and the shaft seat are movably combined. One end of the first upper connecting arm 141 and the second upper connecting arm 142 is movably coupled to both sides of the first shaft seat 11 by the first upper shaft body 145A. The other end of the first upper connecting arm 141 and the second upper connecting arm 142 is movably coupled to both sides of the second shaft seat 12 by the second upper shaft body 145B. One end of the third upper connecting arm 143 and the fourth upper connecting arm 144 is movably coupled to both sides of the first shaft seat 11 by the third upper shaft body 145C. The other end of the third upper connecting arm 143 and the fourth upper connecting arm 144 is movably coupled to both sides of the second shaft seat 12 by the fourth upper shaft body 145D. Therefore, the first upper connecting arm 141 and the third upper connecting arm 143 form a parallelogram on one side of the first shaft seat 11 and the second shaft seat 12, and the second upper connecting arm 142 and the fourth upper connecting arm 144 form a parallelogram (i.e., equal in length and parallel) on the other side of the first shaft seat 11 and the second shaft seat 12.

In an embodiment of the present invention: The third connecting arm assembly C has a first lower connecting arm 151, a second lower connecting arm 152, and a first lower shaft body 155A and a second lower shaft body 155B connecting the first lower connecting arm 151 and the second lower connecting arm 152. The fourth connecting arm assembly D has a third lower connecting arm 153, a fourth lower connecting arm 154, and a third lower shaft body 155C and a fourth lower shaft body 155D connecting the third lower connecting arm 153 and the fourth lower connecting arm 154. The shaft body and the connecting arm are fixedly combined (e.g., fixed by welding), but the shaft body and the shaft seat are movably combined. One end of the first lower connecting arm 151 and the second lower connecting arm 152 is movably coupled to both sides of the second shaft seat 12 by the first lower shaft body 155A. The other end of the first lower connecting arm 151 and the second lower connecting arm 152 is movably coupled to both sides of the third shaft seat 13 by the second lower shaft body 155B. One end of the third lower connecting arm 153 and the fourth lower connecting arm 154 is movably coupled to both sides of the second shaft seat 12 by the third lower shaft body 155C. The other end of the third lower connecting arm 153 and the fourth lower connecting arm 154 is movably coupled to both sides of the third shaft seat 13 by the fourth lower shaft body 155D. Therefore, the first lower connecting arm 151 and the third lower connecting arm 153 form a parallelogram on one side of the second shaft seat 12 and the third shaft seat 13, and the second lower connecting arm 152 and the fourth lower connecting arm 154 form a parallelogram (i.e., equal in length and parallel) on the other side of the second shaft seat 12 and the third shaft seat 13.

In an embodiment of the present invention, the first gear 16 is provided on the second upper shaft body 145B between the first upper connecting arm 141 and the second upper connecting arm 142 and close to the second shaft seat 12; and the second gear 17 is provided on the first lower shaft body 155A between the first lower connecting arm 151 and the second lower connecting arm 152 and close to the second shaft seat 12. The first gear 16 and the second gear 17 are respectively fixedly combined with the second upper shaft body 145B and the first lower shaft body 155A (e.g., fixed by welding). The second upper shaft body 145B and the first lower shaft body 155A drive the first gear 16 and the second gear 17 on the shaft to generate a reaction force to achieve synchronous rise and fall.

In this embodiment, the pushing device 2 is an electric screw assembly. The movable end 22 and the fixed end 21 of the electric screw assembly are combined with the upper support unit 14 and the lower support unit 15 respectively. The driving unit 23 is used to drive the screw of the electric screw assembly to rotate forward or backward to extend or shorten the movable end 22, thereby achieving the function of lifting or lowering. In a feasible embodiment, the driving unit 23 may be a DC electric motor, an AC electric motor, a stepping electric motor, or a servo electric motor, etc., which is not limited in the present invention.

In another embodiment, the pushing device 2 can also be a hydraulic control device (not shown in the figure), the movable end and the fixed end of which are respectively combined with the upper support unit 14 and the lower support unit 15. The driving unit is used to pressurize or depressurize the hydraulic cylinder of the hydraulic control device. Specifically, the hydraulic control device mainly uses a hydraulic pump to convert mechanical energy into pressure to push the hydraulic oil, and changes the flow direction of the hydraulic oil by controlling various valves, so as to push the hydraulic cylinder to perform different stroke actions. In the same way, the pushing device 2 can also be a hydraulic cylinder (not shown in the figure), the movable end and the fixed end of which are combined with the upper support unit 14 and the lower support unit 15 respectively. The driving unit is used to pressurize or depressurize the hydraulic cylinder, and convert the hydraulic pressure into a rising thrust and/or a falling pull.

The state of use of the present invention will be described below. Please refer to FIG. 1 to FIG. 4. When the pushing device 2 is activated, the driving unit 23 drives the movable end 22 to extend. The movable end 22 pushes the third upper connecting arm 143 and the fourth upper connecting arm 144 to cooperate with the third upper shaft body 145C and the fourth upper shaft body 145D on both sides of the second shaft seat 12 to move upward. At the same time, the first upper connecting arm 141 and the second upper connecting arm 142 are linked to move upward in cooperation with the first upper shaft body 145A and the second upper shaft body 145B on both sides of the second shaft seat 12. The first upper connecting arm 141, the second upper connecting arm 142, the third upper connecting arm 143, and the fourth upper connecting arm 144 are used to cooperate with each shaft body, which move upward in conjunction with the first shaft seat 11 on both sides of the first shaft seat 11. Then the upper support unit 14 drives the first shaft seat 11 to rise, and when the upper support unit 14 moves upward, the first gear 16 provided between the first upper connecting arm 141 and the second upper connecting arm 142 cooperates with the second gear 17 provided between the first lower connecting arm 151 and the second lower connecting arm 152 to mesh with each other and rotate in order to produce the required reaction force. The shaft body of the lower support unit 15 is pulled to rotate so that the first lower connecting arm 151 and the second lower connecting arm 152 cooperate with the first lower shaft body 155A and the second lower shaft body 155B on both sides of the second shaft seat 12 to move upward. At the same time, the third lower connecting arm 153 and the fourth lower connecting arm 154 are linked on both sides of the second shaft seat 12 to cooperate with the third lower shaft body 155C and the fourth lower shaft body 155D to move upward. This allows the first lower connecting arm 151, the second lower connecting arm 152, the third lower connecting arm 153 and the fourth lower connecting arm 154 to cooperate with the respective shaft bodies to link the second shaft seat 12 on both sides of the third shaft seat 13 to move upward. Then the lower support unit 15 is raised synchronously, and the upper support unit 14 and the lower support unit 15 are expanded, so that the object 3 is driven by the linkage mechanism 1 to rise (as shown in FIG. 3). On the contrary, if the driving unit 23 drives the movable end 22 to contract, the linkage mechanism 1 can be folded in the opposite direction to drive the object 3 down.

In this way, the effect of simple structure and large load capacity can be achieved so that the linkage mechanism 1 can easily drive the object 3 to rise or fall.

If only a single upper support unit 14 or a single lower support unit 15 is provided, that is, only relying on a single parallelogram to push, there will be a lot of resistance during the lifting process, and this resistance will offset the thrust, so not only can it not rise and fall vertically, but it will also make the moving speed slow. However, the present invention is provided with both an upper support unit 14 and a lower support unit 15. When the pushing device 2 pushes the upper support unit 14 and the lower support unit 15, it will drive the second upper shaft body 145B and the first lower shaft body 155A to run to generate the reaction force between the first gear 16 and the second gear 17, and drive to rise and fall synchronously, thereby generating a double stroke. The design of two parallelograms makes the design of the lifting thrust fulcrum different. Its action method is like using a jack to apply force, which relatively reduces the generation of resistance, so that the thrust to push the object 3 is doubled compared to the single parallelogram. In this way, the pushing resistance is reduced, and the vertical lifting can be achieved. At the same time, the travel speed of the stroke can be doubled, thereby reducing energy consumption, making it more environmentally friendly and energy-saving.

In an embodiment of the present invention, the linkage mechanism 1 further includes at least two elastic units 19 provided on both sides of the upper support unit 14 and the lower support unit 15 respectively. Each elastic unit 19 has an upper fixing seat 191, a lower fixing seat 192, a guide rod 193 and a spring 194. Each upper fixing seat 191 is provided on the first upper connecting arm 141 and the second upper connecting arm 142 on both sides of the upper support unit 14. Each lower fixing seat 192 is provided on the first lower connecting arm 151 and the second lower connecting arm 152 on both sides of the lower support unit 15. Each guide rod 193 is provided on each lower fixing seat 192, and can movably pass through each upper fixing seat 191. Each spring 194 is sleeved on each guide rod 193 and abuts each upper fixing seat 191 and each lower fixing seat 192. In order to prevent the spring 194 from being exposed to the environment and oxidizing or pinching people when the spring 194 is tightened, in a feasible embodiment, a protective sleeve 195 may be provided on the outer side of the spring 194 so as to store the spring 194 inside the protective sleeve 195.

Therefore, when the upper support unit 14 and the lower support unit 15 are expanded to allow the first shaft seat 11 to rise so that the object 3 is driven by the linkage mechanism 1 to rise and fall, the released state and the compressed state of each spring 194 can provide lifting assistance. For example: because of the design of the conventional motor, the power of the motor will be wasted if it does not carry the object 3 when descending; while in the present invention, if the load bearing force increases by 200 kg when descending, each elastic unit 19 will increase the thrust of the strong spring by 200 kg when it rises in the reverse direction, plus the 600 kg thrust produced by the pushing device 2, the total thrust is 800 kg, which achieves the effect of leveraging the force, and is more energy-saving and environmentally friendly. Each elastic unit 19 also has a shock absorbing effect to prevent the pushing device 2 from sliding down quickly.

Please refer to FIG. 5, which is a schematic diagram of another application embodiment of the present invention. In one embodiment of the present invention, the overall size of the invention can be increased, and the first shaft seat 11 of the linkage mechanism 1 is provided with a large carrying platform 4, which can be used as a parking tower for parking a vehicle 5.

When the carrying platform 4 and the vehicle 5 are to be raised, the upper support unit 14 is driven by the pushing device 2 to move upward, and the first gear 16 and the second gear 17 are used to cooperate with each other to generate the required reaction force, so that the lower support unit 15 rises synchronously and then the upper support unit 14 and the lower support unit 15 are expanded to drive the first shaft seat 11 to rise, so that the carrying platform 4 and the vehicle 5 are driven by the linkage mechanism 1 to rise. In this way, the effect of simple structure and large load capacity can be achieved so that the linkage mechanism 1 can easily drive the carrying platform 4 and the vehicle 5 to rise.

When the carrying platform 4 and the vehicle 5 are to be lowered, the upper support unit 14 is driven by the pushing device 2 to move downward, and the first gear 16 and the second gear 17 are used to cooperate with each other to generate the required reaction force, so that the lower support unit 15 is lowered synchronously, and then the upper support unit 14 and the lower support unit 15 are in a state of abutting each other, so that the carrying platform 4 and the vehicle 5 are driven by the linkage mechanism 1 to descend.

Figure 6:
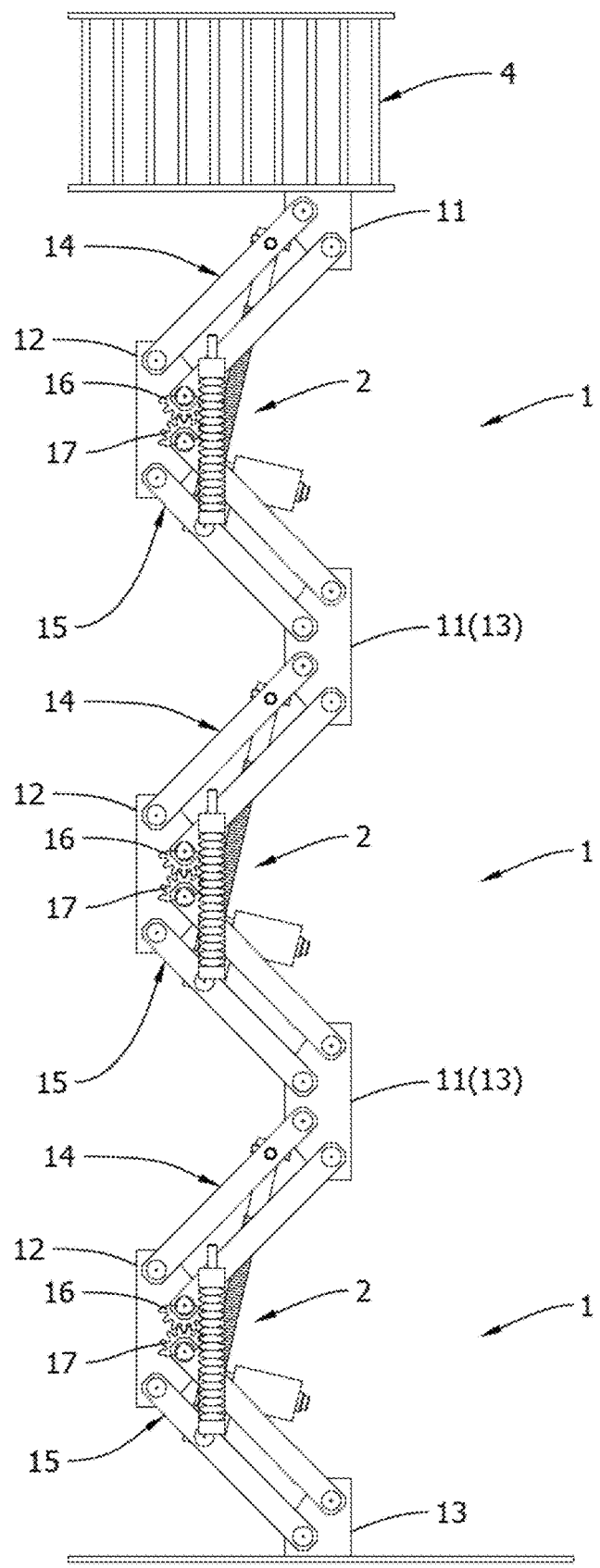
FIG. 6 is a schematic diagram of still another application embodiment of the present invention.

Please refer to FIG. 6, which is a schematic diagram of still another application embodiment of the present invention. In an embodiment of the present invention, a plurality of linkage mechanisms 1 are stacked in layers, wherein the first shaft seat 11 of the linkage mechanism 1 located below is connected or co-constructed with the third shaft seat 13 of the linkage mechanism 1 stacked above the first shaft seat 11 to increase the overall size of the invention in terms of height, and the first shaft seat 11 at the uppermost end of the linkage mechanism 1 is provided with a carrying platform 4, which can carry objects or persons as a lifting platform. In the present invention, the number of stacked layers of the linkage mechanism 1 or the height range of the overall structure that can be raised and lowered is not limited. The number of stacked layers of the linkage mechanism 1 can be planned and implemented according to the desired lifting height.

When the carrying platform 4 is to be raised, the pushing device 2 of each linkage mechanism 1 drives the corresponding upper support unit 14 to move upward, and the first gear 16 and the second gear 17 of each linkage mechanism 1 are used to cooperate with each other to generate the required reaction force, so that the lower support unit 15 of each linkage mechanism 1 rises synchronously and then the upper support units 14 and the lower support units 15 are expanded to drive the first shaft seats 11 to rise, so that the carrying platform 4 is driven by the plural linkage mechanisms 1 to rise. In this way, the effect of simple structure and large load capacity can be achieved so that the plural linkage mechanisms 1 can easily drive the carrying platform 4 to rise.

When the carrying platform 4 is to be lowered, the pushing device 2 of each linkage mechanism 1 drives the corresponding upper support unit 14 to move down, and the first gear 16 and the second gear 17 of each linkage mechanism 1 are used to cooperate with each other to generate the required reaction force, so that the lower support units 15 are lowered synchronously, and then the upper support units 14 and the lower support units 15 are in a state of abutting each other, so that the carrying platform 4 is driven by the plural linkage mechanisms 1 to descend.

In summary, the double parallelogram vertical lifting device of the present invention can effectively improve the deficiency of conventional device. The required object can be combined with the first shaft seat, and the upper support unit is driven by the pushing device to move up or down, and the first gear and the second gear are used to cooperate with each other to generate a reaction force, so that the lower support unit rises or falls synchronously, and then the upper support unit and the lower support unit are expanded or folded, so that the object is driven by the linkage mechanism to rise or fall, thereby achieving the effects of simple structure, small size, high stroke, and large load capacity. This obviously makes the invention more advanced, practical and meets the needs of users, and it should have the basic requirements for patent application, so the invention application is filed according to law.

The above description is merely the preferred embodiment of the present invention and cannot limit the technical scope of the invention, which means the equivalent modification and implementation made with reference to the claims and the specification of the invention should still fall within the scope of the patent granted for the invention in the future.

What is claimed is:

1. A double parallelogram vertical lifting device, including:
   a linkage mechanism, including a first shaft seat, a second shaft seat, a third shaft seat, an upper support unit whose two ends are movably coupled to the first shaft seat and the second shaft seat, and a lower support unit whose two ends are movably coupled to the second shaft seat and the third shaft seat, wherein the upper support unit is provided with a first gear, and the lower support unit is provided with a second gear that meshes with the first gear; and a pushing device, one end of which is set on the upper support unit, and another end of which is set on the lower support unit;

wherein, the upper support unit has a first connecting arm assembly and a second connecting arm assembly arranged in parallel with each other between the first shaft seat and the second shaft seat, and two ends of the first connecting arm assembly and the second connecting arm assembly are movably coupled to the first shaft seat and the second shaft seat to form a parallelogram on both sides of the first shaft seat and the second shaft seat respectively; and the lower support unit has a third connecting arm assembly and a fourth connecting arm assembly arranged in parallel with each other between the second shaft seat and the third shaft seat, and two ends of the third connecting arm assembly and the fourth connecting arm assembly are movably coupled to the second shaft seat and the third shaft seat to form a parallelogram on both sides of the second shaft seat and the third shaft seat respectively;

wherein the first connecting arm assembly has a first upper connecting arm, a second upper connecting arm, and a first upper shaft body and a second upper shaft body connecting the first upper connecting arm and the second upper connecting arm; the second connecting arm assembly has a third upper connecting arm, a fourth upper connecting arm, and a third upper shaft body and a fourth upper shaft body connecting the third upper connecting arm and the fourth upper connecting arm; one end of the first upper connecting arm and the second upper connecting arm is movably coupled to both sides of the first shaft seat by the first upper shaft body; another end of the first upper connecting arm and the second upper connecting arm is movably coupled to both sides of the second shaft seat by the second upper shaft body; one end of the third upper connecting arm and the fourth upper connecting arm is movably coupled to both sides of the first shaft seat by the third upper shaft body; and another end of the third upper connecting arm and the fourth upper connecting arm is movably coupled to both sides of the second shaft seat by the fourth upper shaft body, so that the first upper connecting arm and the third upper connecting arm form a parallelogram on one side of the first shaft seat and the second shaft seat, and the second upper connecting arm and the fourth upper connecting arm form a parallelogram on another side of the first shaft seat and the second shaft seat.

2. The double parallelogram vertical lifting device of claim 1, wherein the pushing device includes a fixed end, a movable end, and a driving unit, the movable end and the fixed end are respectively combined with the upper support unit and the lower support unit, and the driving unit drives the movable end to expand and contract with respect to the fixed end.

3. The double parallelogram vertical lifting device of claim 2, wherein the pushing device is a hydraulic cylinder, the movable end and the fixed end of which are respectively combined with the upper support unit and the lower support unit, and the driving unit is used to pressurize or depressurize the hydraulic cylinder.

4. The double parallelogram vertical lifting device of claim 2, wherein the pushing device is an electric screw assembly, the movable end and the fixed end of which are respectively combined with the upper support unit and the lower support unit, and the driving unit is used to drive a screw of the electric screw assembly to rotate forward or backward.

5. The double parallelogram vertical lifting device of claim 2, wherein the pushing device is a hydraulic control device, the movable end and the fixed end of which are respectively combined with the upper support unit and the lower support unit, and the driving unit is used to pressurize or depressurize a hydraulic cylinder of the hydraulic control device.

6. The double parallelogram vertical lifting device of claim 1, wherein the linkage mechanism includes a base for carrying the third shaft seat.

7. The double parallelogram vertical lifting device of claim 1, wherein the third connecting arm assembly has a first lower connecting arm, a second lower connecting arm, and a first lower shaft body and a second lower shaft body connecting the first lower connecting arm and the second lower connecting arm; the fourth connecting arm assembly has a third lower connecting arm, a fourth lower connecting arm, and a third lower shaft body and a fourth lower shaft body connecting the third lower connecting arm and the fourth lower connecting arm; one end of the first lower connecting arm and the second lower connecting arm is movably coupled to both sides of the second shaft seat by the first lower shaft body; another end of the first lower connecting arm and the second lower connecting arm is movably coupled to both sides of the third shaft seat by the second lower shaft body; one end of the third lower connecting arm and the fourth lower connecting arm is movably coupled to both sides of the second shaft seat by the third lower shaft body; another end of the third lower connecting arm and the fourth lower connecting arm is movably coupled to both sides of the third shaft seat by the fourth lower shaft body, so that the first lower connecting arm and the third lower connecting arm form a parallelogram on one side of the second shaft seat and the third shaft seat, and the second lower connecting arm and the fourth lower connecting arm form a parallelogram on another side of the second shaft seat and the third shaft seat.

8. The double parallelogram vertical lifting device of claim 7, wherein the first gear is provided on the second upper shaft body between the first upper connecting arm and the second upper connecting arm, and the second gear is provided on the first lower shaft body between the first lower connecting arm and the second lower connecting arm.

9. The double parallelogram vertical lifting device of claim 1, wherein the linkage mechanism includes at least two elastic units, and each elastic unit is respectively provided on both sides of the upper support unit and the lower support unit.

10. The double parallelogram vertical lifting device of claim 9, wherein each elastic unit has an upper fixing seat, a lower fixing seat, a guide rod and a spring, wherein each upper fixing seat is provided on both sides of the upper support unit, each lower fixing seat is provided on both sides of the lower support unit, each guide rod is provided on each lower fixing seat and movably passes through each upper fixing seat, and each spring is sleeved on each guide rod and abuts each upper fixing seat and each lower fixing seat.

* * * * *